US00RE47955E

(19) United States
(12) Reissued Patent
Rivera et al.

(10) Patent Number: US RE47,955 E
(45) Date of Reissued Patent: Apr. 21, 2020

(54) FOLDING TABLE

(71) Applicant: AMTAB MANUFACTURING CORP., Aurora, IL (US)

(72) Inventors: Jeremias Rivera, Elmhurst, IL (US); Doss Samikkannu, Des Plaines, IL (US)

(73) Assignee: AMTAB MANUFACTURING CORP., Bensenville, IL (US)

(21) Appl. No.: 15/923,146

(22) Filed: Mar. 16, 2018

Related U.S. Patent Documents

Reissue of:
(64) Patent No.: 9,297,395
Issued: Mar. 29, 2016
Appl. No.: 14/584,456
Filed: Dec. 29, 2014

U.S. Applications:
(60) Provisional application No. 61/921,707, filed on Dec. 30, 2013.

(51) Int. Cl.

| | |
|---|---|
| ***A47B 3/00*** | (2006.01) |
| ***F16B 2/18*** | (2006.01) |
| ***A47B 3/091*** | (2006.01) |
| *A47B 3/08* | (2006.01) |

(52) U.S. Cl.
CPC ..... *F16B 2/185* (2013.01); *A47B 3/0911* (2013.01); *A47B 3/0815* (2013.01); *A47B 2200/0036* (2013.01); *Y10T 403/595* (2015.01)

(58) Field of Classification Search
CPC ..... E05C 1/10; E05C 1/08; E05C 1/14; E05B 63/20; E05B 65/0864; E05B 17/0037; E05F 11/00; A47B 3/002; A47B 3/08; A47B 3/0818; A47B 3/0918; A47B 3/00
See application file for complete search history.

(56) References Cited

U.S. PATENT DOCUMENTS

| | | | | | |
|---|---|---|---|---|---|
| 524,146 | A | * | 8/1894 | Hottes | 292/175 |
| 681,366 | A | * | 8/1901 | Fuller | A47B 1/08 103/83 |
| 1,516,995 | A | * | 11/1924 | Trigueiro | 292/175 |
| 1,678,982 | A | * | 7/1928 | Griffin | 292/171 |
| 1,689,101 | A | * | 10/1928 | Beck | 292/175 |
| 1,711,972 | A | * | 5/1929 | Seiler | 292/62 |
| 1,913,966 | A | * | 6/1933 | Walter | 108/89 |
| 1,953,549 | A | * | 4/1934 | Biszantz | 292/254 |
| 2,764,460 | A | * | 9/1956 | Nelson | 108/169 |
| 2,831,741 | A | * | 4/1958 | Wilson | 108/169 |
| 4,475,464 | A | * | 10/1984 | Deconinck | A47B 1/02 108/83 |

(Continued)

OTHER PUBLICATIONS

U.S. Appl. No. 14/584,456, filed Dec. 29, 2014.

*Primary Examiner* — Cary E Wehner
(74) *Attorney, Agent, or Firm* — Barnes & Thornburg LLP

(57) ABSTRACT

A folding table that includes a base with two pedestal assemblies having base frames pivotally connected to each other is provided. One base frame is attached to a table top and both base frames are connected by a linkage assembly. A gas cylinder assembly is connected to the linkage assembly. A latch assembly attached to the bottom surface of the table top engages with a stop member on the base frame that is not attached to the table top. A latch assembly for a folding table and methods of operating the folding table are also provided.

26 Claims, 6 Drawing Sheets

(56) References Cited

U.S. PATENT DOCUMENTS

| | | | | | |
|---|---|---|---|---|---|
| 5,174,225 | A * | 12/1992 | Reise et al. | 108/150 | |
| 6,070,367 | A * | 6/2000 | Wagner et al. | 52/7 | |
| 6,076,867 | A * | 6/2000 | Dollman et al. | 292/174 | |
| 6,126,211 | A * | 10/2000 | Dominquez | 292/174 | |
| 6,192,808 | B1 | 2/2001 | Bue | | |
| 6,550,838 | B2 * | 4/2003 | Bobbitt, III | B62D 33/037 292/175 | |
| 7,712,422 | B2 | 5/2010 | Bue | | |
| 2012/0204766 | A1 | 8/2012 | Elliott et al. | | |

* cited by examiner

FOLDING TABLE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application claims the benefit of priority under 35 U.S.C. §119 from U.S. Provisional Patent Application Ser. No. 61/921,707 entitled "FOLDING TABLE," filed on Dec. 30, 2013, the disclosure of which is hereby incorporated by reference in its entirety for all purposes.

TECHNICAL FIELD

The present invention relates generally to folding tables, and more specifically to a folding table with a locking assembly.

BACKGROUND OF THE INVENTION

Folding tables are known in the art. Traditionally, folding tables are guided between a folded (e.g., stored) position and an unfolded (e.g., open) position by multiple linkage assemblies positioned between folding halves of a base of the table. Traditional folding tables may also include yet another linkage assembly for a damper. Further, traditional folding tables are secured in the stored position by a locking mechanism having a non-ergonomic lever hidden under the table top or have no locking mechanism at all. The lever is typically not comfortable to manipulate and deforms after repeated use. In addition, traditional folding tables have a base structure formed from light gauge tubing and linkages formed from flat members. The base structure also has one support member between a pair of table legs and one support member for each set of linkage assemblies.

While such folding tables according to the prior art provide a number of advantages, they nevertheless have certain limitations. For example, multiple linkage assemblies formed from flat members provide many moving points that may pinch or snag fingers or clothing of the user. Further, a separate linkage assembly for a damper provides yet another moving point. Each of the linkage assemblies may bend or warp through repeated usage. In another example, the release lever to unlock the table from the open position is difficult to reach, requiring the user to bend over to find the lever underneath the table top. Further, the release lever is not finger friendly and is difficult to manipulate. In another example, the tubing and flat members used for the base structure and linkage assemblies are typically lightweight metal used to minimize cost. Further, having only one support member between a set of table legs or connecting a set of linkage assemblies allows the base and linkage structures to deform or fail from repeated use or loading. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention is directed to a folding table. The folding table includes a base having first and second pedestal assemblies, the first pedestal assembly comprising a first base frame and the second pedestal assembly comprising a second base frame. The folding table also includes first and second base pivot assemblies connecting the first and second pedestal assemblies. The folding table further includes a linkage assembly connecting the first and second pedestal assemblies, the linkage assembly having first and second link members and two or more link pivot assemblies. The folding table also includes a table top assembly having a table top and a frame, the frame having two or more support members. The folding table further includes a cylinder assembly having a gas cylinder connected to the linkage assembly by two of the two or more link pivot assemblies. The folding table also includes a latch assembly comprising a first portion attached to a bottom surface of the table top, the first portion comprising a handle, a handle mount and a connecting member, and a second portion, the second portion comprising a lock member and a lock member mount.

The present invention is also directed to a latch assembly for a folding table. The latch assembly includes a first portion attached to a surface of a table top, the first portion comprising a handle, a handle mount and a connecting member. The latch assembly also includes a second portion, the second portion comprising a lock member and a lock member mount, wherein the connecting member is configured to connect the handle to the lock member.

The present invention is also directed to a method of closing a folding table. The method includes pulling a handle disposed on a bottom surface of a table top of an unfolded table in a direction away from a first base frame comprising a stop member, the table top of the unfolded table being supported by the first base frame and a second base frame both positioned within a perimeter of a frame and supporting the table top, the handle connected to a lock member by a connecting member, the pulling comprising a force that overcomes a biasing force of a spring of a lock member mount, wherein a resulting movement of the lock member causes the lock member to move axially clear of the stop member. The method also includes lifting, with a first force, an edge of the table top upward in a direction away from the base, wherein the first force is enough for the table top to move to a position for which a tipping point of a cylinder assembly is reached, wherein the cylinder assembly begins to exert a second lifting force on the table top, wherein the first base frame pivotally moves in relation to the second base frame. The method further includes continuing to lift the edge of the table top with a lesser amount of the first force and guiding the table top into a fully closed position, wherein the first base frame is not engaged with the table top and the second base frame is attached to the table top.

BRIEF DESCRIPTION OF THE DRAWINGS

To understand the present invention, it will now be described by way of example only, not by way of limitation, with reference to the accompanying drawings in which.

DETAILED DESCRIPTION

Figure 1:
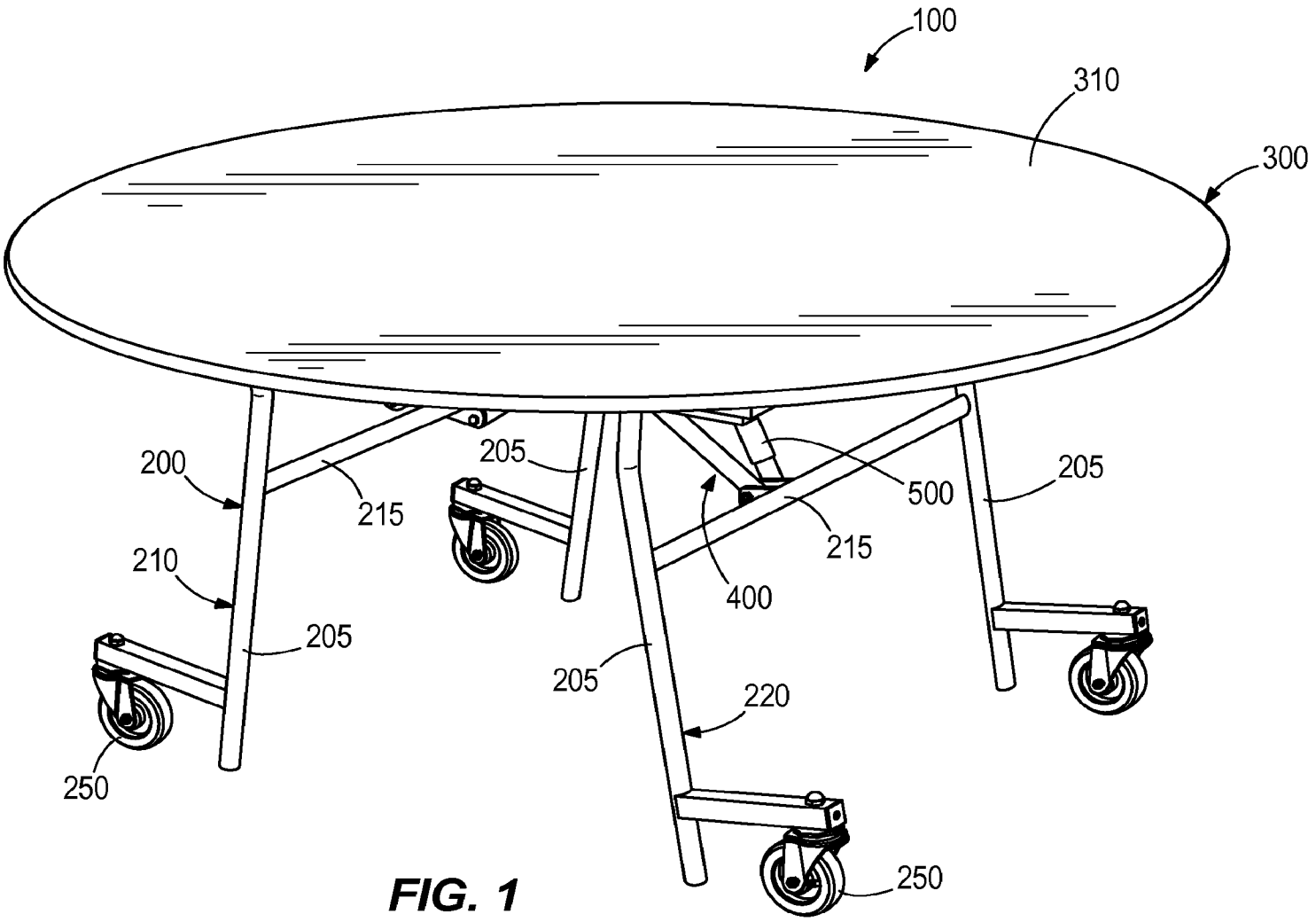
FIG. 1 is a perspective view of an embodiment of a folding table in the open position.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
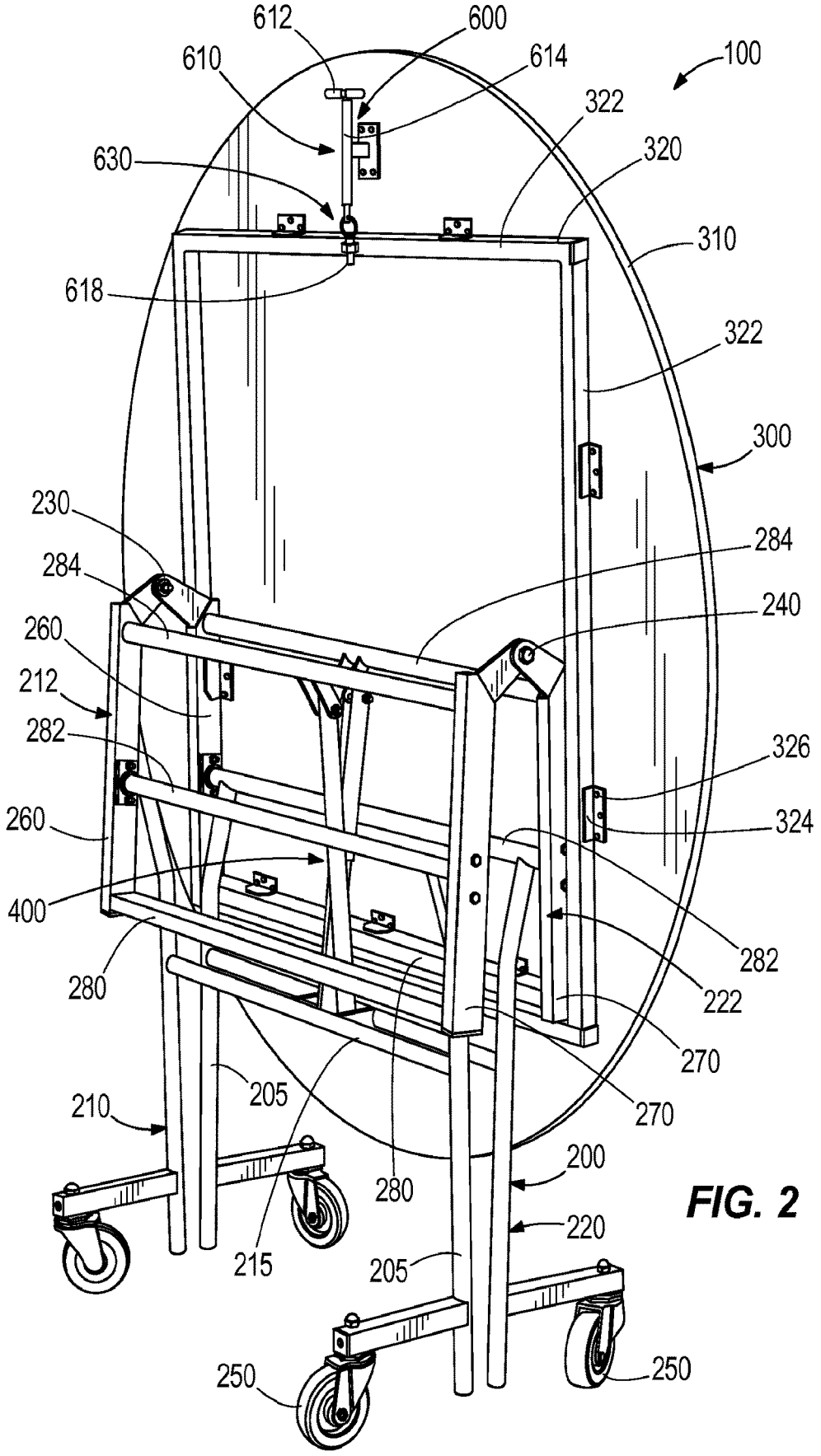
FIG. 2 is a perspective view of the folding table of FIG. 1 in the closed position.
Figure 3:
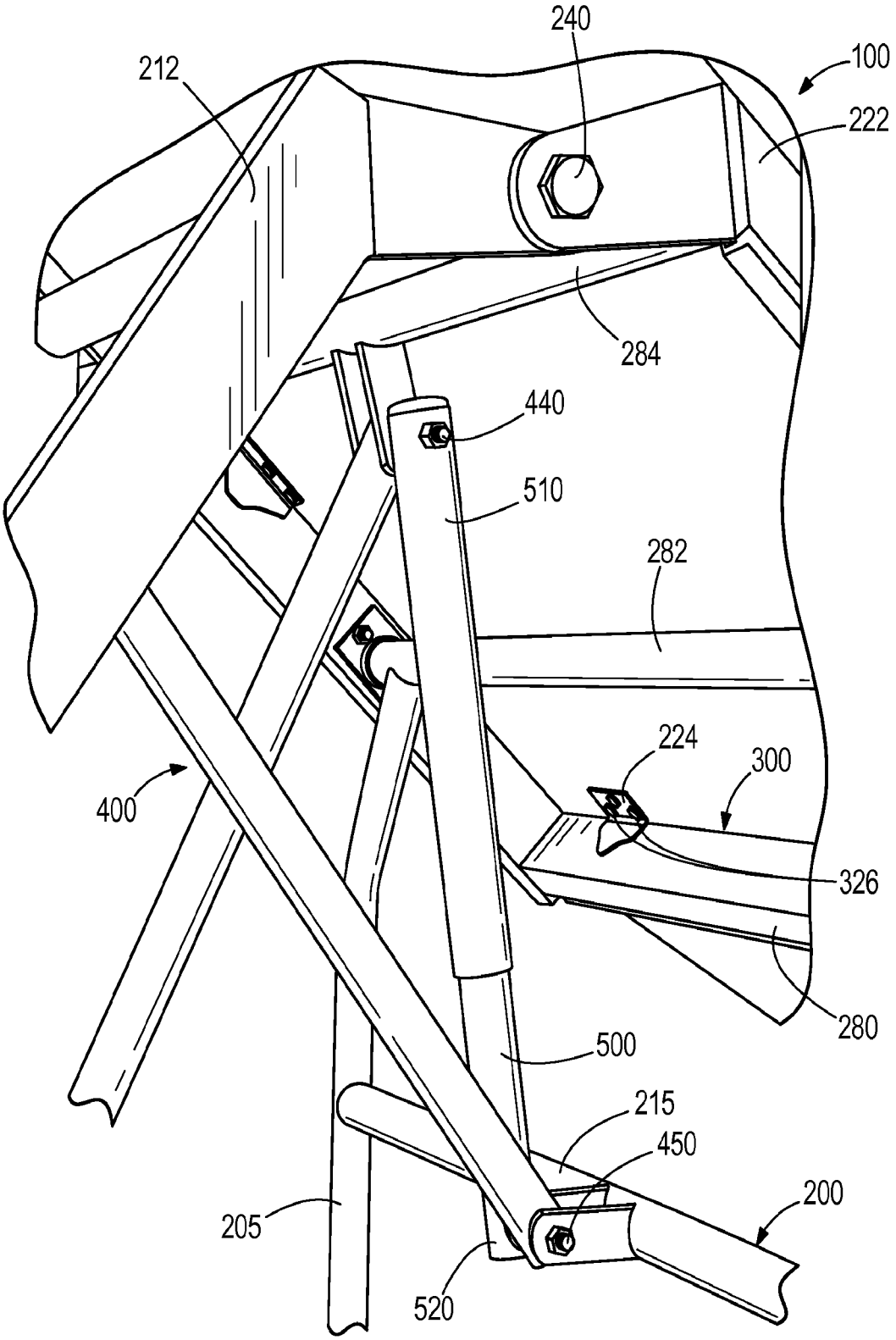
FIG. 3 is a perspective view of a portion of the folding table of FIG. 1 in a partially open position.

Referring now to the figures, specifically to FIGS. 1 through 3, there is shown a folding table 100 generally comprising a base 200, a table top assembly 300, a linkage assembly 400, a cylinder 500 and a latch assembly 600. The base 200 is sized and shaped to support the table top assembly 300. The folding table 100 may be configured to be locked in the open or unfolded position (see FIG. 1) and to be unlocked in the closed or folded position (see FIG. 2). Here the folding table 100 is shown as a round table, though other configurations of folding tables are contemplated. For example, folding table 100 may be a rectangular table, a square table, an oval table and the like.

In one or more embodiments, the base 200 includes first and second pedestal assemblies 210, 220 connected by first and second base pivot assemblies 230, 240 and the linkage assembly 400. The first and second pedestal assemblies 210, 220 each include two swivel mounted wheels 250 for easy movement of the folding table 100. Alternatively, the first and second pedestal assemblies 210, 220 may have movement members such as swivel mounted balls, glides and the like. The first and second pedestal assemblies 210, 220 are preferably formed of a combination of round and rectangular tubing, though any combination of round tubing, triangular tubing, oval tubing, square tubing, rectangular tubing and the like are also contemplated. The first and second pedestal assemblies 210, 220 are preferably powder coated steel or steel alloy metal, though stainless steel, aluminum, chrome plating and like metals and finishes are also contemplated.

The first and second pedestal assemblies 210, 220 are configured to connect to a portion of the linkage assembly 400. The first pedestal assembly 210 (e.g., first base frame support member 280) is further configured to engage with a portion of the latch assembly 600 when the folding table 100 is in the open or unfolded position. Alternatively, the latch assembly 600 may be configured to engage with the second pedestal assembly 220 (e.g., first base frame support member 280) instead of the first pedestal assembly 210, or both first and second pedestal assemblies 210, 220 may each engage with a latch assembly 600.

As shown in FIG. 2, in one or more embodiments the table top assembly 300 includes a table top 310 and a frame 320. The frame 320 is sized and shaped to provide a perimeter on the bottom surface of the table top 310. The frame 320 is also configured to connect with and/or support a portion of the latch assembly 600. The frame 320 may be secured to the table top 310 by brackets, fasteners (e.g., screws, rivets, bolts), adhesives and the like. The frame 320 includes support members 322 that are configured in a similar shape as a combination of first and second base frames 212, 222, which are portions of the first and second pedestal assemblies 210, 220 that engage with the table top 310. The frame 320 is connected together (e.g., welded together) and is configured to support the entire table top 310, thereby providing durability of the folding table 100.

Here, both the frame 320 and the combined portions of the first and second pedestal assemblies 210, 220 that engage with the table top 310 are rectangular shaped, with the frame 320 being sized slightly larger than the combination of first and second base frames 212, 222. The support members 322 may be individual components connected together. Alternatively, some or all of the support members 322 may be integrally formed as a single component that is bent in appropriate locations to provide the desired shape, for example. Preferably, support members 322 have a rectangular configuration with angle brackets 324 configured to be attached to the table top 310 by fasteners 326. The angle brackets 324 may be secured to the support members 322 by welds, fasteners, adhesive and the like, or the angle brackets 324 may be integrally formed with the support members 322.

As shown in FIG. 2, the first and second base frames 212, 222 each include first and second base frame members 260, 270. First, second and third base frame support members 280, 282, 284 are connected between the first and second base frame members 260, 270. The second base frame support member 282 is pivotally connected to the first and second base frame members 260, 270. Legs 205 are connected to the second base frame support member 282. Thus, as the folding table 100 is opened and closed, the legs 205 remain essentially vertical while the first and second base frames 212, 222 pivot from an essentially vertical position when the folding table 100 is in the closed or folded position to a horizontal position when the folding table 100 is in the open or unfolded position. Having multiple base frame support members 280, 282, 284 provides high strength and durability to the base 200, and limits twisting or torqueing of the two pedestal assemblies 210, 220 as the table is opened and closed.

The second base frame 222 is fixedly attached to the bottom surface of the table top 310. The first and second base frame members 260, 270 and the first base frame support member 280 of the second base frame 222 preferably have a rectangular configuration with angle brackets 224 configured to be attached to the table top 310 by fasteners 326. The angle brackets 224 may be secured to the first and second base frame members 260, 270 and the first base frame support member 280 by welds, fasteners, adhesive and the like. Alternatively, the angle brackets 224 may be integrally formed with the first and second base frame members 260, 270 and the first base frame support member 280.

As shown in FIGS. 2 through 5, in one or more embodiments the linkage assembly 400 includes first and second link members 410, 420. A first end 412 of the first link member 410 is pivotally connected to a leg support member 215 of the first pedestal assembly 210 by a first link pivot assembly 430. A second end 414 of the first link member 410 is pivotally connected to the third base frame support member 284 of the second base frame 222 by a second link pivot assembly 440. A first end 422 of the second link member 420 is pivotally connected to a leg support member 215 of the second pedestal assembly 220 by a third link pivot assembly 450. A second end 424 of the second link member 420 is pivotally connected to the third base frame support member 284 of the first base frame 212 by a fourth link pivot assembly 460.

Here, each of the first ends 412, 422 pivots in relation to the first and second pedestal assemblies 210, 220 respectively as the table is folded or unfolded. Further, each of the second ends 424, 414 pivots in relation to the first and second base frames 212, 222 respectively as the table is folded or unfolded. Also, the first and second base assemblies 212, 222 pivot in relation to each other about the first and second base pivot assemblies 230, 240. The base and link pivot assemblies 230, 240, 430, 440, 450, 460 may include any combination of an axle, a bolt, a screw and the like, as well as nuts, washers and the like (see FIG. 3).

As shown in FIG. 3, the cylinder 500 is preferably connected between portions of the linkage assembly 400. Here, a first end 510 of the cylinder 500 is pivotally connected at the second link pivot assembly 440 and a second end 520 of the cylinder 500 is pivotally connected at the third link pivot assembly 450. Alternatively, the cylinder 500 may be connected to any combination of the link pivot assemblies 430, 440, 450, 460, or there may be two cylinders 500, each cylinder 500 connected to different link pivot assemblies 430, 440, 450, 460. The cylinder 500 may be a gas cylinder and the like.

In operation, the cylinder 500 is biased towards opening up or extending axially, thereby forcing the second link pivot assembly 440 away from the third link pivot assembly 450, thus pushing the first and second pedestal assemblies 210, 220 away from each other. Here, the cylinder 500 assists the user in lifting the table top 310 from the open (e.g., horizontal) position to the closed (e.g., vertical) position. This is especially helpful when the table top 310 is large and/or heavy. The cylinder 500 may be configured to provide a biasing force that is based on the weight of the table top 310 and the amount of lifting force desired to be required of the user. For example, the cylinder 500 may be configured (e.g., sized, tuned, calibrated) to allow a user to lift the table top 310 with a single finger (e.g., minimal lifting force by the user). Conversely, in the opening or unfolding process, the cylinder 500 assists the user in lowering the table top 310 into the open position. For example, the biasing force of the cylinder 500 prevents the table top 310 from crashing down into the open position once the opening motion is started, and therefore allows the table top 310 to be lightly guided into the open position (e.g., minimal countering force by the user).

The first and second ends 510, 520 of the cylinder 500 may be connected to the linkage assembly 400 in specific locations so that the cylinder 500 is particularly positioned to provide desired lifting characteristics. For example, the position of the second link pivot assembly 440 and/or third link pivot assembly 450 may be varied to change the vector angles of the cylinder 500 through the range of positions between opening and closing the folding table 100. These variations in vector angles may change the tipping point at which the cylinder begins to assist or increases assistance to the user's lifting or closing force. For example, a user may have to provide a specific lifting force for the first few inches of travel as the folding table 100 begins moving from an unfolded position to a folded position. Once the folding table 100 has been lifted the first few inches (e.g., the tipping point has been reached), the cylinder 500 may provide sufficient lifting force to move the folding table 100 the rest of the way into a folded position with only a slight or no lifting force required from the user. By changing the position of the cylinder 500, the tipping point may be changed to any desired position of the folding table 100 (e.g., less than an inch, over a foot). The cylinder 500 position may also be configured based on the size of the second and/or third link pivot assemblies 440, 450, the position of the leg support member 215 in relation to the first and second pedestal assemblies 210, 220, the length of the cylinder 500, and the like.

Figure 4:
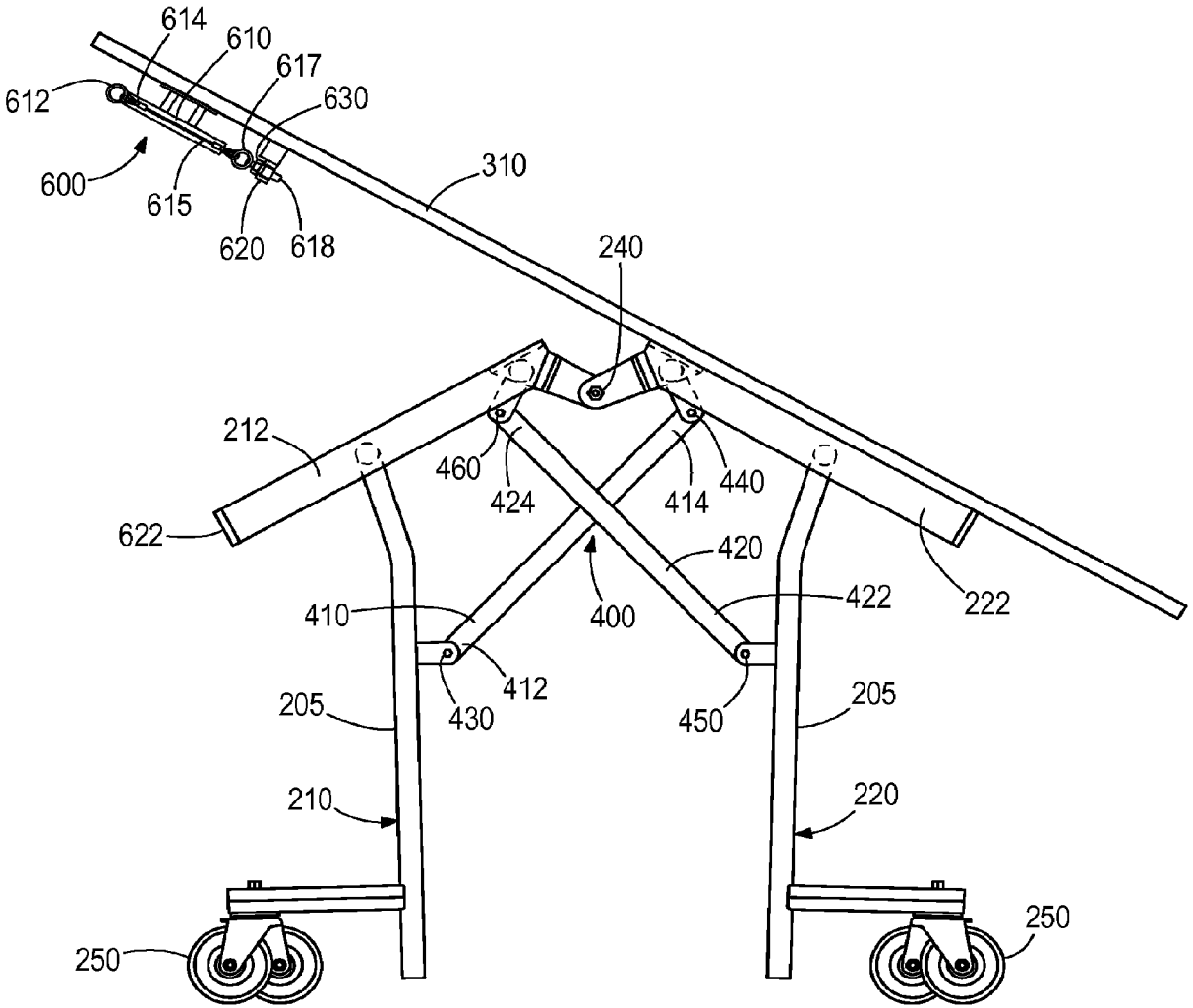
FIG. 4 is a front elevation view of an embodiment of a folding table in a partially open position.
Figure 5:
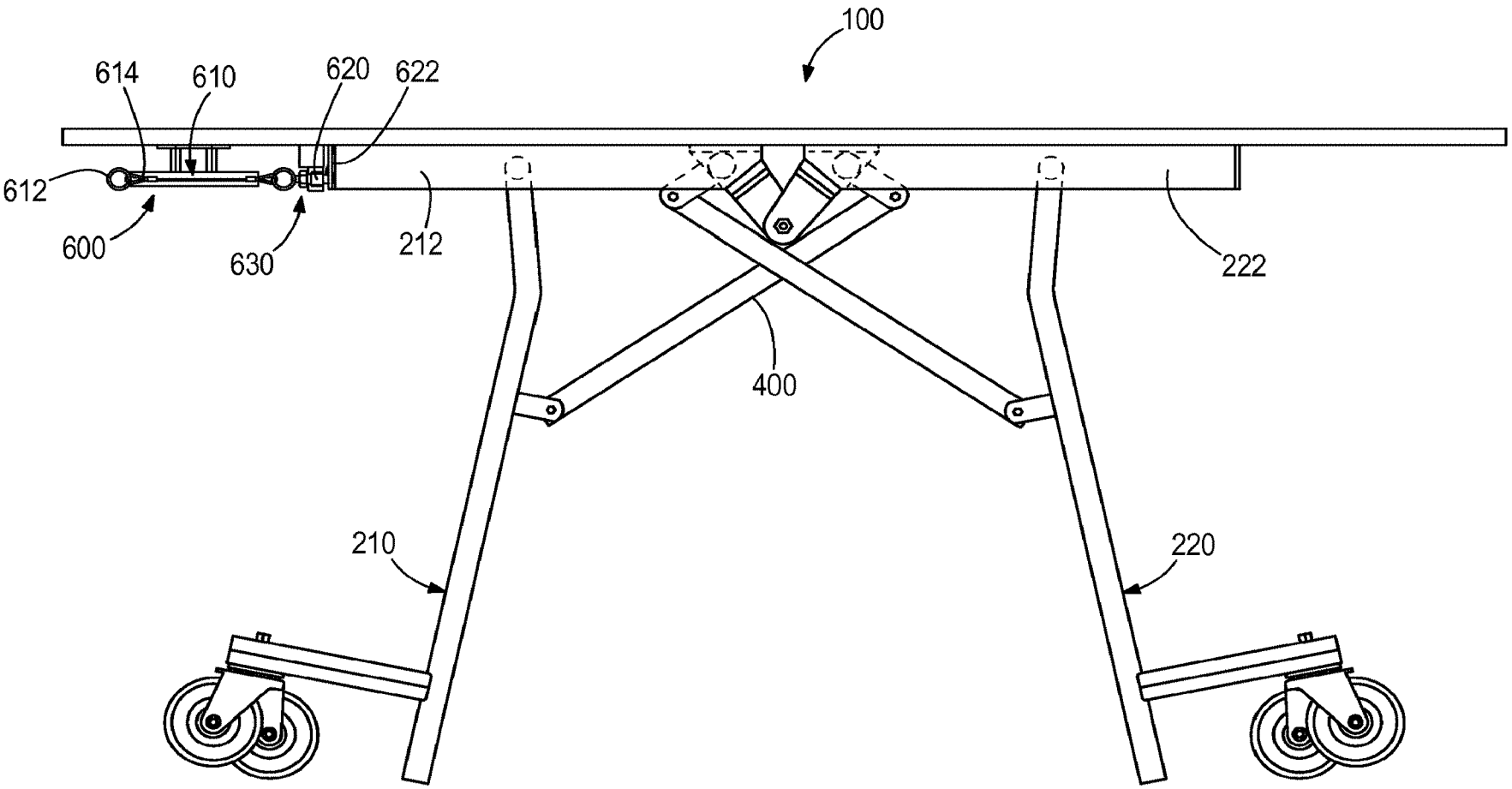
FIG. 5 is a front elevation view of the folding table of FIG. 4 in an open position.
Figure 6:
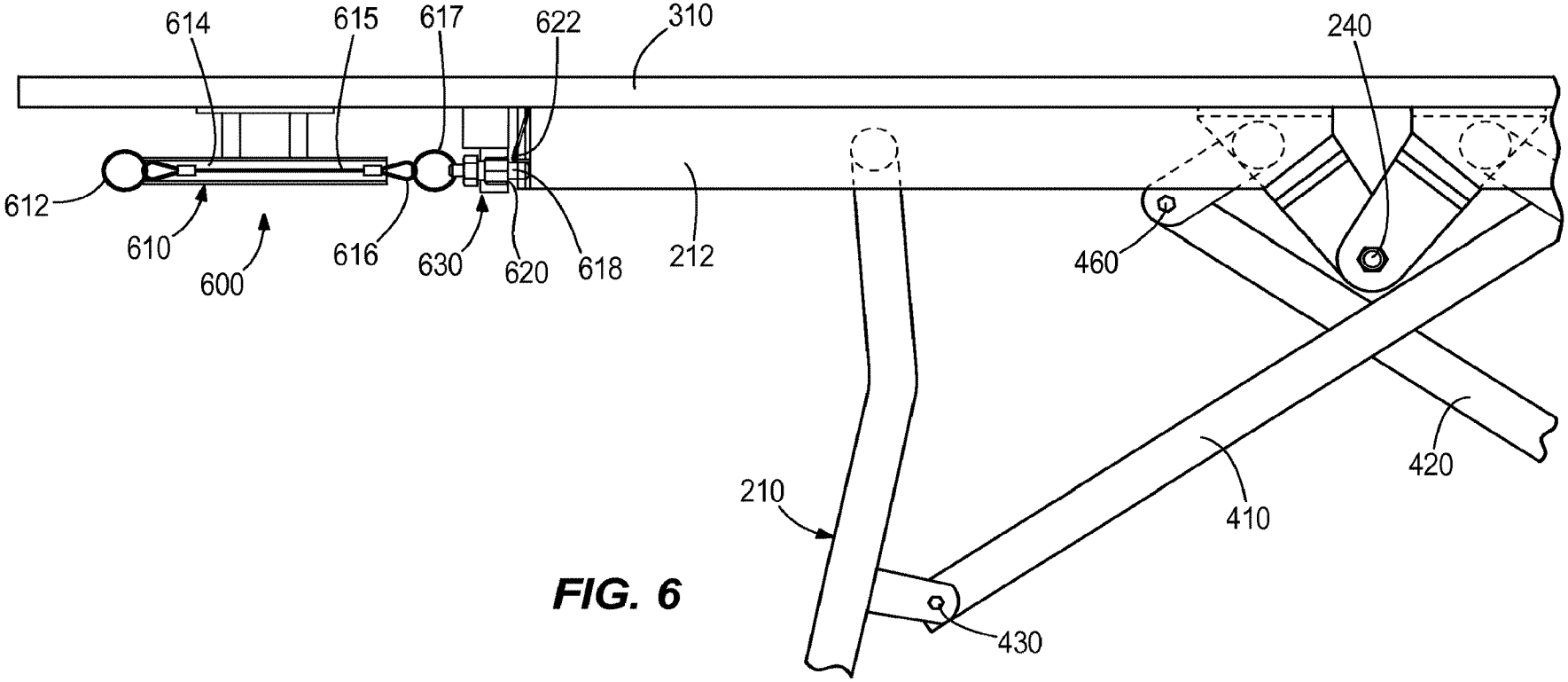
FIG. 6 is a front elevation view of a portion of the folding table of FIG. 5 in an open position.

As shown in FIGS. 2 and 4 through 6, in one or more embodiments a first portion 610 of the latch assembly 600 is mounted on or attached to the bottom of the table top 310. A second portion 630 of the latch assembly 600 may be mounted on or attached to the frame 320 as shown in FIG. 2. Alternatively, the second portion 630 of the latch assembly 600 may be mounted on or attached to the table top 310 as shown in FIGS. 4 through 6. The first portion 610 includes a handle 612, a handle mount 614 and a connecting member 616. Here the handle 612 is an ergonomically shaped handle that is comfortable and easy for a user to grip. Also, the handle 612 is easy to find by feeling under the table top 310 when the handle 612 is in the retracted position, without having to bend down and visually see the handle 612 and without having the handle 612 stick out from the side of the table top 310. The handle 612 is attached to the table top 310 by the handle mount 614.

The second portion 630 of the latch assembly 600 includes a lock member 618 and a lock member mount 620. The lock member 618 is attached to the table top 310 or the frame 320 by the lock member mount 620. The lock member 618 may be a retractable bolt, pin and the like. The connecting member 616 of the first portion 610 is connected to the lock member 618. Here, the connecting member 616 is a wire 615 connected to the handle 612 and a ring 617 connected to the lock member 618. The lock member mount 620 may include a spring (not shown) to bias the lock member 618 inward towards the center of the table top 310.

A stop member 622 is disposed on the first base frame 212 and is configured to engage the lock member 618 when the folding table 100 is in the open position. The stop member 622 may be somewhat L shaped, with the top of the L shape being connected to a top portion of the first base frame 212. The bottom portion of the L shaped stop member 622 may be configured to be positioned parallel to the lock member 618 when the folding table 100 is in the open position, thus preventing the lock member 618 from being able to move upwards along the outer edge of the first frame base 212 until the lock member 618 is retracted by operation of the handle 612. Alternatively to having the lock member 618 engage the stop member 622, the lock member 618 may be configured to engage a hole in the first base frame 212, engage the bottom surface of the first base frame 212, and the like. The stop member 622 may be configured to have a spring like biasing force, such that as the folding table 100 is moved into the open position, the lock member 618 may ride along the somewhat vertical portion of the stop member 622, pushing the somewhat vertical portion inwards towards the center of the first base frame 212. Once the lock member 618 clears the somewhat vertical portion of the stop member 622 (e.g., ceases to contact the vertical portion of the stop member 622), the stop member 622 may spring back into the biased position, thereby preventing the stop member 618 from moving upward.

In operation, the handle 612 is pulled outward from the side of the table top 310, causing the lock member 618 to slide outwards away from the first base frame 212. If there is a spring, the force exerted by pulling the handle 612 outwards must overcome the biasing force of the spring. The lock member 618 slides outwards until the ring 617 is stopped by the handle mount 614. At this point, the lock member 618 is clear of the stop member 622 and the table top 310 may be lifted up and positioned into the folded position. Here, the handle 612 provides a natural unlocking of the table by being positioned close to the side of the table top 310 and allowing the unlocking to be a smooth pulling and raising process in one motion. Also, in the folded position the table top 310 may be disposed in a fully vertical position, thereby decreasing the storage footprint and providing more efficient storage of the folding table 100. Conversely, when at least a portion of the lock member 618 is still not axially clear of the stop member 622, the lock member 618 contacts a portion of the stop member 622 when the table top 310 is pulled upwards, thereby holding or locking the table top 310 in the open or unfolded position.

Several alternative examples have been described and illustrated herein. A person of ordinary skill in the art would appreciate the features of the individual embodiments, and the possible combinations and variations of the components. A person of ordinary skill in the art would further appreciate that any of the examples could be provided in any combination with the other examples disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the word "including" as used herein is utilized in an open-ended manner.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A folding table comprising:

a base having first and second pedestal assemblies, the first pedestal assembly comprising a first base frame and the second pedestal assembly comprising a second base frame;

first and second base pivot assemblies connecting the first and second pedestal assemblies;

a linkage assembly connecting the first and second pedestal assemblies, the linkage assembly having first and second link members and two or more link pivot assemblies;

a table top assembly having a table top and a frame, the frame having two or more support members;

a cylinder assembly having a gas cylinder connected to the linkage assembly by two of the two or more link pivot assemblies; and a latch assembly comprising a first portion attached to a bottom surface of the table top, the first portion comprising a handle, a handle mount and a connecting member, and a second portion, the second portion comprising a lock member and a lock member mount, wherein the second base frame is fixedly attached to the bottom surface of the table top within a portion of the perimeter of the frame, the second base frame comprising first and second base frame members connected by first, second and third base frame support members, wherein the second base frame support member is pivotally connected to the first and second base frame members.

2. The folding table of claim 1, wherein the connecting member is connected to the handle and to the lock member, the connecting member comprising a wire and a ring.

3. The folding table of claim 1, wherein the lock member is attached to the table top by the lock member mount.

4. The folding table of claim 1, wherein the lock member is attached to the frame by the lock member mount.

5. The folding table of claim 1, wherein the lock member mount comprises a spring configured to bias the lock member towards the center of the table top.

6. The folding table of claim 1, further comprising a stop member disposed on the first base frame, the stop member configured to engage the lock member when the folding table is in an open position.

7. The folding table of claim 6, wherein the stop member is L shaped and has a spring like biasing force.

8. The folding table of claim 1, wherein a first end of the first link member is pivotally connected to a leg support member of the first pedestal assembly by a first link pivot assembly, and a second end of the first link member is pivotally connected to the second base frame by a second link pivot assembly.

9. The folding table of claim 8, wherein a first end of the second link member is pivotally connected to a leg support member of the second pedestal assembly by a third link pivot assembly, and a second end of the second link member is pivotally connected to the first base frame by a fourth link pivot assembly, the first, second, third and fourth link pivot assemblies configured to position the table top in essentially a vertical position when the folding table is in the closed position.

10. The folding table of claim 9, wherein a first end of the cylinder assembly is pivotally connected to a first portion of the linkage assembly by the second link pivot assembly, and a second end of the cylinder assembly is pivotally connected to a second portion of the linkage assembly by the third link pivot assembly, wherein attachment locations of the gas cylinder to the first and second portions of the linkage assembly are configured to obtain a vector angle of the gas cylinder, wherein the vector angle determines a tipping point at which the gas cylinder begins to assist an opening or closing force exerted on the table top.

11. The folding table of claim 1, wherein the first and second pedestal assemblies and first and second support beams are comprised of one of powder coated steel tubing and powder coated steel alloy tubing.

12. The folding table of claim 1, wherein the first base frame is configured to fit within another portion of the perimeter of the frame when the table is in the open position.

13. A folding table comprising:

a base having first and second pedestal assemblies, the first pedestal assembly comprising a first base frame and the second pedestal assembly comprising a second base frame;

first and second base pivot assemblies connecting the first and second pedestal assemblies;

a linkage assembly connecting the first and second pedestal assemblies, the linkage assembly having first and second link members and first and second link pivot assemblies, wherein a first end of the second link member is pivotally connected to a leg support member of the second pedestal assembly by a third link pivot assembly;

a table top assembly having a table top and a frame, the frame having two or more support members; and a cylinder assembly having a gas cylinder connected to the linkage assembly by two of the two or more link pivot assemblies, wherein a first end of the cylinder assembly is pivotally connected to a first portion of the linkage assembly by the second link pivot assembly, and a second end of the cylinder assembly is pivotally connected to a second portion of the linkage assembly by the third link pivot assembly, wherein attachment locations of the gas cylinder to the first and second portions of the linkage assembly are configured to obtain a vector angle of the gas cylinder, wherein the vector angle determines a tipping point at which the gas cylinder begins to assist an opening or closing force exerted on the table top.

14. The folding table of claim 13, wherein a first end of the first link member is pivotally connected to a leg support member of the first pedestal assembly by the first link pivot assembly, and a second end of the first link member is pivotally connected to the second base frame by the second link pivot assembly.

15. The folding table of claim 13, wherein a second end of the second link member is pivotally connected to the first base frame by a fourth link pivot assembly, the first, second, third and fourth link pivot assemblies configured to position the table top in essentially a vertical position when the folding table is in the closed position.

16. The folding table of claim 13, further comprising:

a latch assembly comprising a first portion attached to a bottom surface of the table top, the first portion comprising a handle, a handle mount and a connecting member, and a second portion, the second portion comprising a lock member and a lock member mount.

*17. A folding table comprising:*

*a base having first and second pedestal assemblies;*

*the first pedestal assembly comprising a first base frame and a first pair of legs pivotably coupled to the first base frame;*

*the second pedestal assembly comprising a second base frame and a second pair of legs pivotably coupled to the second base frame;*

*the first and second pedestal assemblies pivotably coupled together for movement between a folded position and an unfolded position;*

*a linkage assembly having a first link member and a second link member, each of the first and second link members coupled to the first and second pedestal assemblies and configured to coordinate movement of the first and second pedestal assemblies between the folded and unfolded positions;*

*a table top attached to one of the first or second pedestal assemblies for movement therewith between an opened position corresponding to the unfolded position of the first and second pedestal assemblies and a closed position corresponding to the folded position of the first and second pedestal assemblies; and*

*a gas cylinder coupled to the base and configured to bias the first and second pedestal assemblies toward the folded position,*

*wherein attachment locations of the gas cylinder are configured to create a vector angle of the gas cylinder, and the vector angle determines a tipping point at which the gas cylinder begins to assist an opening or closing force exerted on the table top.*

*18. The folding table of claim 17, wherein the first base frame includes two spaced apart first base frame members and two spaced apart first base frame support members extending between the first base frame members, and wherein the second base frame includes two spaced apart second base frame members and two spaced apart second base frame support members extending between the second base frame members.*

*19. The folding table of claim 18, wherein the first pair of legs are coupled to one of the first base frame support members that is pivotably coupled to the first base frame members, and wherein the second pair of legs are coupled to one of the second base frame support members that is pivotably coupled to the second base frame members.*

*20. The folding table of claim 19, further comprising a first leg support member coupled to the first pair of legs and a second leg support member coupled to the second pair of legs.*

*21. The folding table of claim 20, wherein the first link member is coupled to the first base frame and the second leg support member, and wherein the second link member is coupled to the second base frame and the first leg support member.*

*22. The folding table of claim 17, wherein a first end of the gas cylinder is coupled to a first portion of the linkage assembly and a second end of the gas cylinder is coupled to a second portion of the linkage assembly.*

*23. The folding table of claim 17, wherein a first end of the gas cylinder is coupled to the first base frame and a second end of the gas cylinder is coupled to the first pair of legs.*

*24. The folding table of claim 17, wherein a first end of the gas cylinder is coupled to the first base frame and a second end of the gas cylinder is coupled to the second pair of legs.*

*25. The folding table of claim 17, wherein a first end of the gas cylinder is coupled to the first base frame and a second end of the gas cylinder is coupled to the second base frame.*

*26. The folding table of claim 17, wherein a first end of the gas cylinder is coupled to the second base frame and a second end of the gas cylinder is coupled to the first pair of legs.*

* * * * *